United States Patent [19]

Deplante

[11] 4,345,662
[45] Aug. 24, 1982

[54] INSTALLATION WITH AUTOMATIC VEHICLES

[75] Inventor: Michel Deplante, Paris, France
[73] Assignee: MATRA, Paris, France
[21] Appl. No.: 101,336
[22] Filed: Dec. 7, 1979
[51] Int. Cl.³ .......................... B60T 7/16; B62D 1/28
[52] U.S. Cl. .................................... 180/168; 180/169; 250/202; 250/215
[58] Field of Search ................. 180/168, 169, 167, 21; 280/91; 250/202, 205

[56] References Cited

U.S. PATENT DOCUMENTS

| 2,493,755 | 1/1950 | Ferrill, Jr. .......................... 180/168 |
| 3,749,197 | 7/1973 | Deutsch ............................. 180/169 |
| 3,814,025 | 6/1974 | Nelson ............................... 280/91 X |
| 4,049,961 | 9/1977 | Marcy ............................. 180/169 X |
| 4,077,535 | 3/1978 | Oriol ............................... 180/168 X |

FOREIGN PATENT DOCUMENTS

| 629811 | 5/1936 | Fed. Rep. of Germany ........ 280/91 |
| 932887 | 9/1955 | Fed. Rep. of Germany ........ 280/91 |
| 2258764 | 6/1973 | Fed. Rep. of Germany ...... 180/168 |
| 599000 | 3/1948 | United Kingdom .................. 180/21 |

*Primary Examiner*—Joseph F. Peters, Jr.
*Assistant Examiner*—Milton L. Smith
*Attorney, Agent, or Firm*—Pollock, VandeSande & Priddy

[57] ABSTRACT

An installation for vehicles moving automatically, without human intervention, between starting and arrival points along a predetermined path consisting of stops, junctions, crossings, inlets, outlets of elevators, etc.

An installation in which each self-propelling vehicle is adapted to carry a load and has steering-wheels and a central driving-wheel as well as optical detectors designed to read an optical track laid out on the ground and furnishing passive driving signals, the vehicle also being provided with an ultrasonic emitter-receiver assembly working as a radar and operative to detect obstacles along the path of movement of the vehicle.

7 Claims, 12 Drawing Figures

INSTALLATION WITH AUTOMATIC VEHICLES

The present invention concerns an installation comprising vehicles which move automatically along a defined path and which are adapted to carry a load between predetermined starting and arrival points without human intervention.

It is already known to provide installations which comprise automatically guided vehicles.

In some of said known installations, an optical track is provided on the ground and said optical track is read by an optical detector put on board each vehicle. The optical signals received by the vehicles are then processed for bringing the motion of said vehicles under the control of said optical track.

However, the known optical installations show the drawback of not being sufficiently efficient and reliable, of not taking parasite signals into account and of not following the optical guide-track closely enough, particularly in bends, along switches, etc. Magnetic vehicle guidance installations which are also known, are even less desirable since they are very complex and do not lend themselves to modification as easily as an optical guidance track.

The present invention is aimed at remedying the foregoing drawbacks of the prior art and to this end provides an installation with automatic vehicles, easily put in position, adapted to guide vehicles with accuracy and to transmit to them a great number of signals connected to the running path through means provided on the optical guide-path.

To this end, the invention relates to an installation in which each self-propelling vehicle carries a plurality of spaced steering-wheels and a single central driving-wheel, as well as optical detectors designed to read on optical track laid out on the ground and carrying operating signals, as well as an ultrasonic emitter-receiver assembly working as a radar and defining a volume of obstacle detections to control the operation of the vehicle when an obstacle is detected in the path of the vehicle, as well as a means on the vehicle for receiving a load which is to be transported along said path between starting and arrival points without any human intervention.

The present invention will be described in more detail by reference to the attached drawings, wherein.

Figure 1:
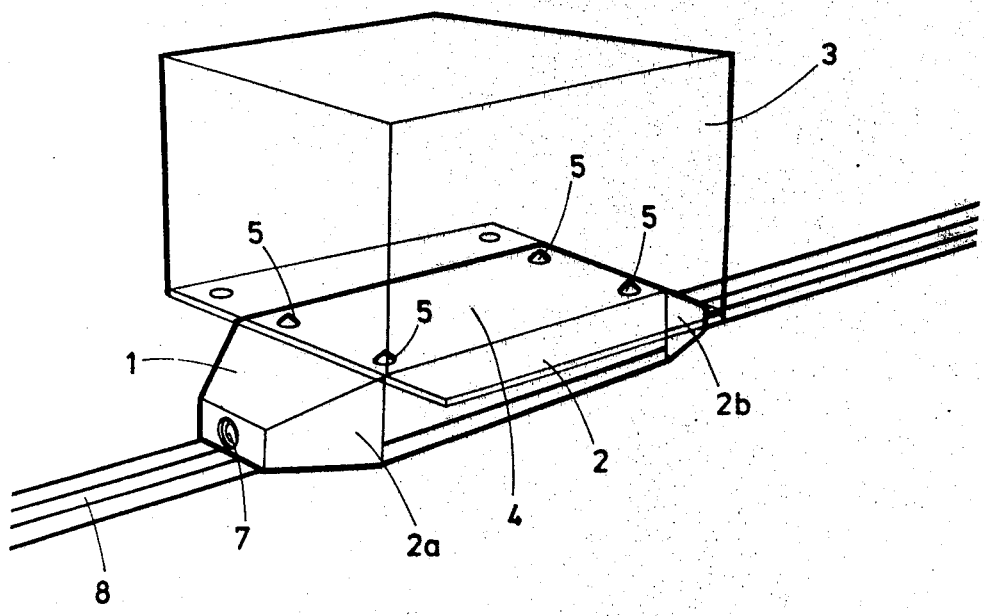
FIG. 1 is a diagrammatical perspective view of a vehicle adapted to move automatically along an optically defined path for carrying a load from a starting point to an arrival point.

As shown in FIG. 1, a vehicle 1, of the type used in the automatic guidance installation of the present invention is symmetrical in both the shape of and working planes provided by the vehicle. Said vehicle can equally move either forward or backward without any preference whatever as to the driving or guiding thereof. The body 2 is symmetrical and both ends thereof 2a, 2b decrease in shape so as to facilitate the maneuvring and engagement of the vehicle under a load 3.

The vehicle 1 carries load 3 on the plate 4 of said vehicle, which is capable to be lifted up; said load 3 and plate 4 being integrated with one another by means of cooperating shapes, for example projecting cones or tests 5 located on said plate 4 and corresponding conical cavities located in the lower surface of the load to be carried. Said load can be a pallet or a carriage with a plate.

The front end 2a and the rear end 2b of the vehicle each carries a collision detector 7 consisting of one or more ultrasonic emitters and of one or more ultrasonic receivers co-operating as a radar for detecting obstacles such as pedestrians, carriages, etc . . . which would be on the way of the vehicle. Also, the detectors 7 make it possible to automatically maneuver and guide the vehicle so as to make it enter an elevator by firstly detecting the door and then the bottom thereof. The vehicle 1 is guided along a path of movement that is defined by a guide-line 8 carrying signalling elements perceptible by the vehicle; also, said vehicle receives guiding and operating information supplied by a central control station, such as instructions relating to the route to be traveled, to stops, etc. Said instructions are, for example, previously registered or can be transmitted to the vehicle when it is passing given points along its path of travel.

Figure 2:
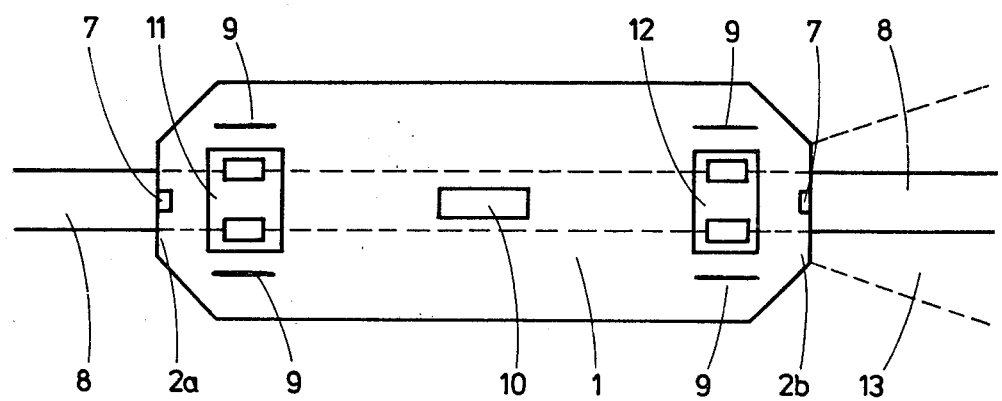
FIG. 2 is a diagrammatical view from above of the automatic vehicle shown in FIG. 1.

FIG. 2 shows the guiding and supporting wheels 9 of the vehicle and the driving wheel 10 thereof. The four wheels 9 are located at each corner of the vehicle 1 and the wheel 10 is located at the center thereof. At each end of the vehicle an optical detector 11, 12 is provided which detects optical information in the track 8 supplying guiding signals for the vehicle.

The right part of FIG. 2 shows at the end 2b of the vehicle 1 the lobe 13 of the ultrasonic emitter or emitters 7. When an obstacle is located in said lobe it reflects ultrasounds towards the emitter-receiver 7 and, the latter processes the signal received and discriminates noise. The signal is processed to control the the motion of the vehicle.

Figure 3:
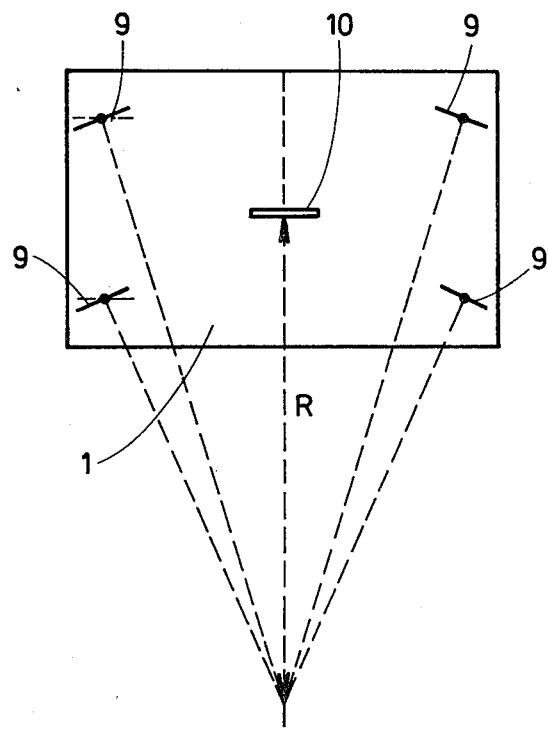
FIG. 3 is a diagrammatical view of the guidewheels and driving wheel of a vehicle according to FIGS. 1 and 2.

As shown in FIG. 3, the four guiding wheels 9 of the vehicle are connected to each other by links so that said wheels 9 pivot in unison in the same direction so as to reduce the turning circle R of the vehicle and chiefly so that the center of said vehicle (driving-wheel 10) can follow the track 8 as closely as possible. This is of importance to assure that the vehicle can take bends with a small curvature, and also to assure that the optical detectors on the vehicle generate signals from the track 8 itself, and do not generate false signals due to departure of the vehicle from the track.

Each optical detector 11, 12 consists of two identical parts. Since each of said identical parts 11, 12 detects the respective edge of the track, one of them only will be described in relation to FIG. 4.

Figure 4:
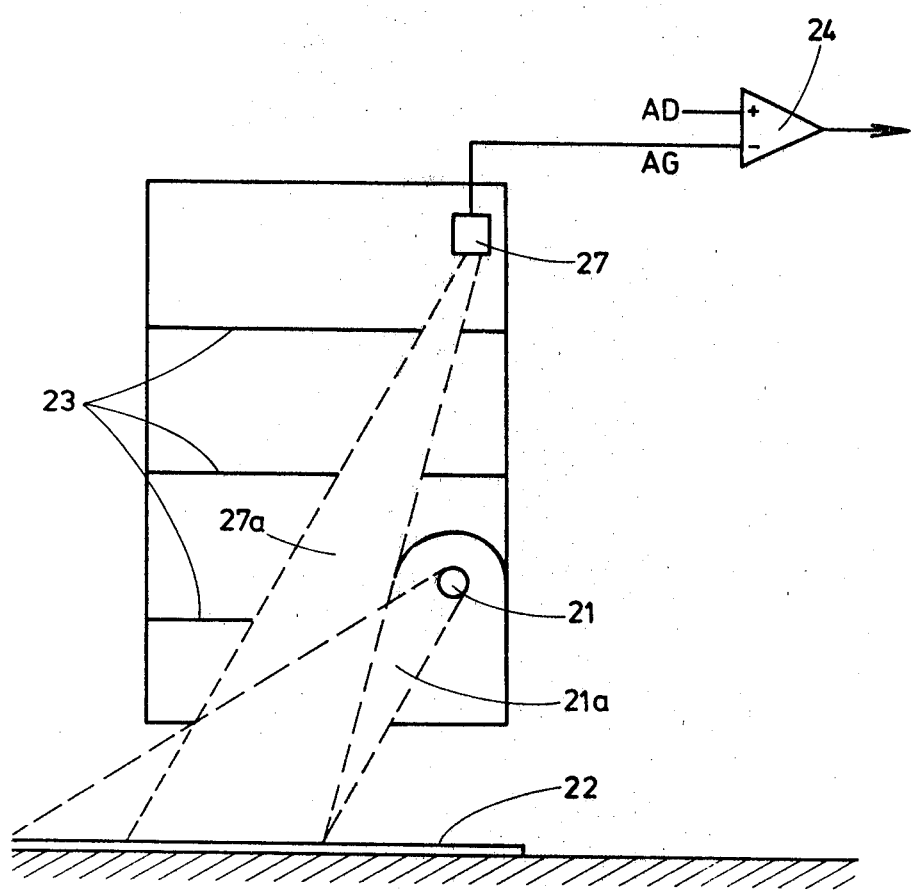
FIG. 4 is a diagrammatical view of an optical detector used in the vehicle of the present invention.

FIG. 4 shows a part of such an optical detector which consists of a light emitter 21 and a receiver 27 whose areas 21a, 27a are superposed on a level with the paint strip 22 forming a portion of the optical guidance track.

The light emitted by the emitter 21 illuminates the paint strip 22. A part of said illuminated region, corresponding to a rectangle centered on the edge of said paint strip 22, is located opposite the photo-cell of the receiver 27. Anti-reflection walls 23 limit the field of view of the receiver 27. Geometrical precautions must be taken with respect to the positioning of receiver 27 to assure that, whatever the irregularities of the track, the light emitted by the emitter 21 does not impinge directly, or by reflection within the detector, on the receiver 27 and also to assure that the light reflected from the strip 22 does impinge on the receiver 27.

The signals provided by the two receivers 27 of the same detector (only one of which receivers is shown in FIG. 4) are amplified respectively in two amplifiers AD, AG whose output signals are connected, one of them to the negative input, the other to the positive input, of a comparator 24 whose output signal operates the steering elements of the vehicle. Comparator 24 acts as a sum and difference circuit which receives the signals from the two optical receivers, checks at the same time that said difference is practically null and that said sum corresponds to the double of an average value, and provides an output signal for controlling the steering wheels 9 of the vehicle when the difference between the signals from the two optical receivers is not null in average.

Figure 5:
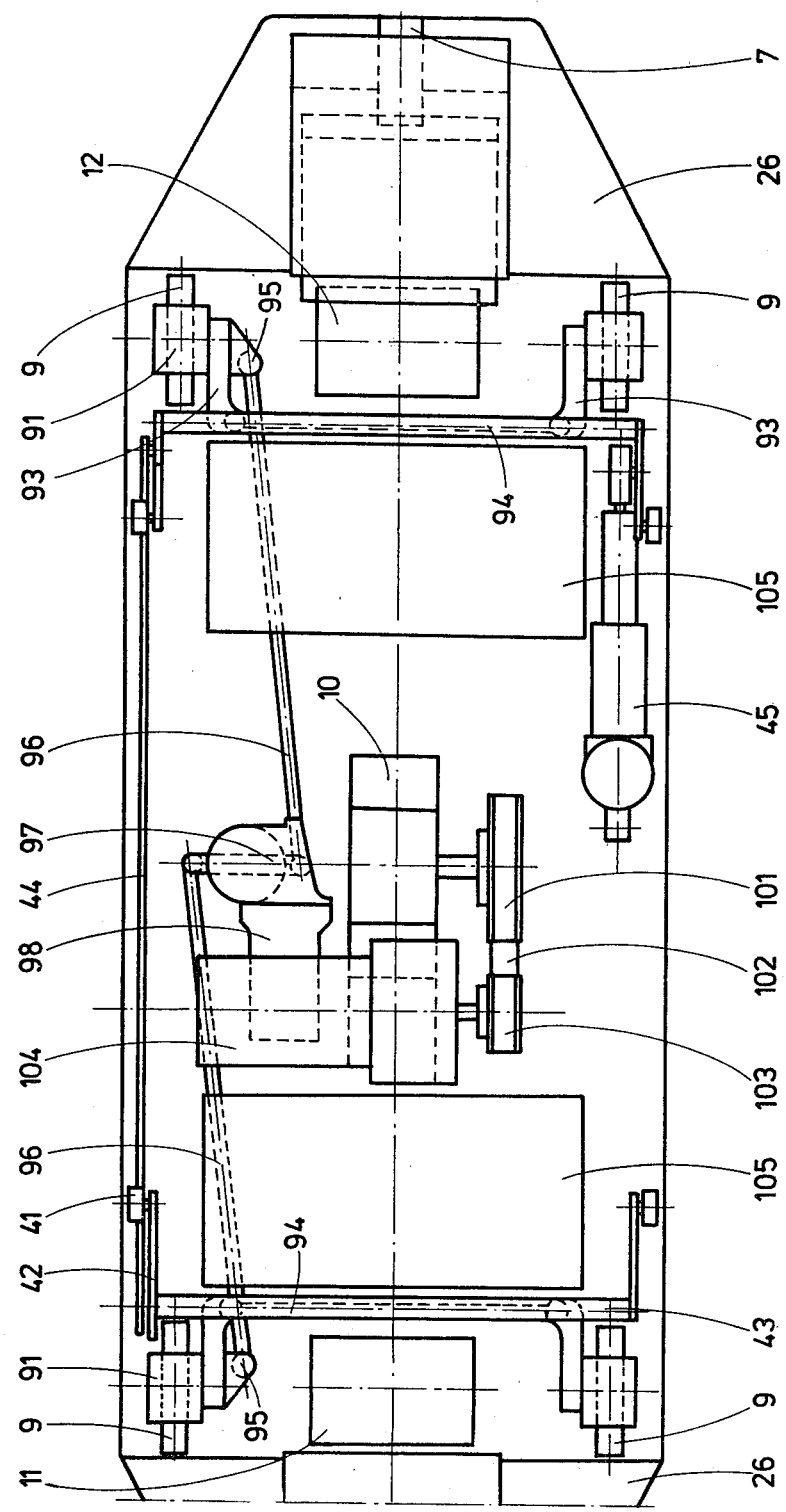
FIG. 5 is a plan view of an embodiment of a vehicle provided by the invention.
Figure 6:
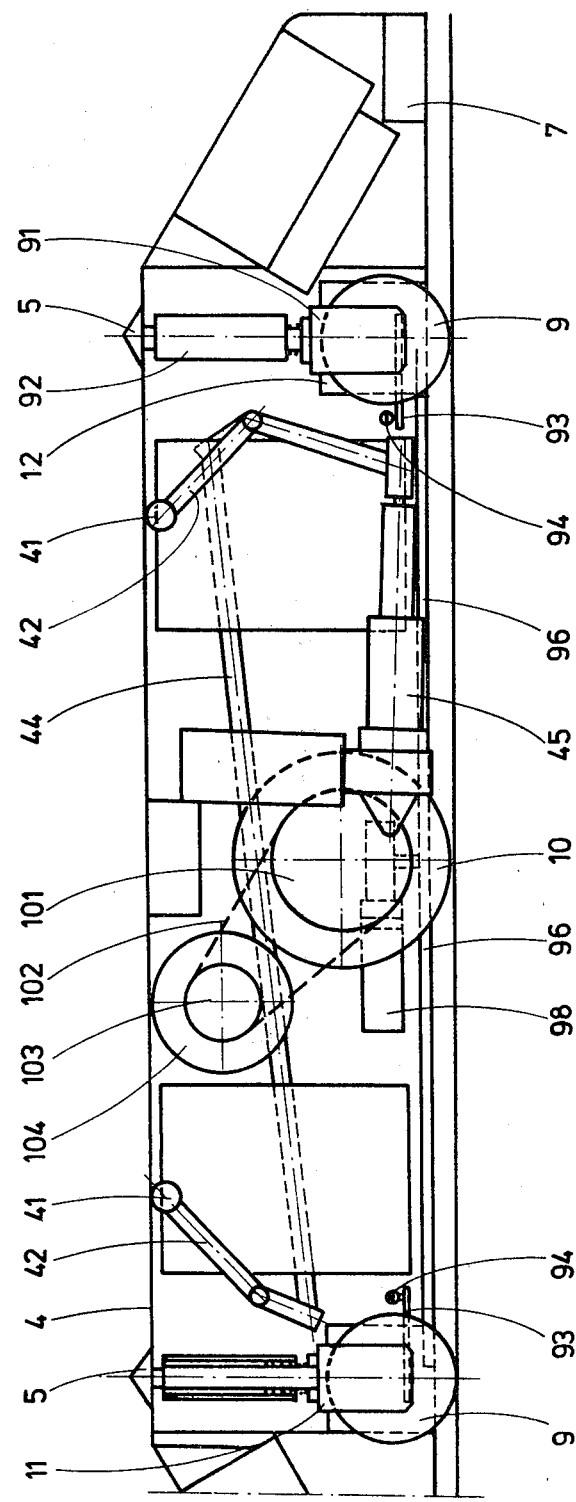
FIG. 6 is a side view of the vehicle shown in FIG. 5.

FIGS. 5 and 6 show in detail the preferred embodiment of a vehicle constructed in accordance with the present invention. This description will be made with the same references as above for designating the same elements and will be limited to the details which were not yet described.

The guiding and support wheels 9 are mounted in bearings 91 which are themselves mounted on vertical shock-absorbers 92. Said bearings 91 carry arms 93 supporting the wheels. The arms 93 of the front wheels are connected to one another by a small rod 94, and the arms of the rear wheels are connected to one another by a small rod 94.

One of the front bearings 91 and one of the rear bearings 91 carries a bracket 95 each of which supports one end of a respective small rod 96; the other ends of both small rods 96 are connected to the arm 97 of a maneuvering element 98, such as a gear box that is operated depending on the signals supplied by the guidecircuit, not shown in this Figure.

The driving of the vehicle is effected by a driving wheel 10 which is centrally located along the axis of the vehicle. A pulley 101 connected to said wheel 10 is driven by a belt 102 from the outlet pulley 103 of a gear mechanism 104.

The various electric circuits and motors of the vehicle are fed from two groups of batteries 105 located respectively at the front and rear ends of the vehicle so as to equally distribute the weight.

The liftable load support surface of the vehicle consists of four slippers 41 supported by arms 42. The two front arms 42 and two rear arms 42 are connected to one another by an intervening rotatable connecting bar 43. In addition, one of said front arms and one of said rear arms are connected to one another by a driving rod 44 and a jack 45 acts upon one of said bars. As a result of this arrangement, bars 42 can swing through the action of a driving element such as said jack 45 for lifting or lowering a load. The positioning of the load of the supporting surface constituted by the upper part or the plate 4 of the body (see FIG. 1) is ensured by the aforementioned teats 5.

Finally, FIGS. 5 and 6 show the front and rear detectors 11, 12 overlapping the longitudinal axis of symmetry of the vehicle.

Figure 7:
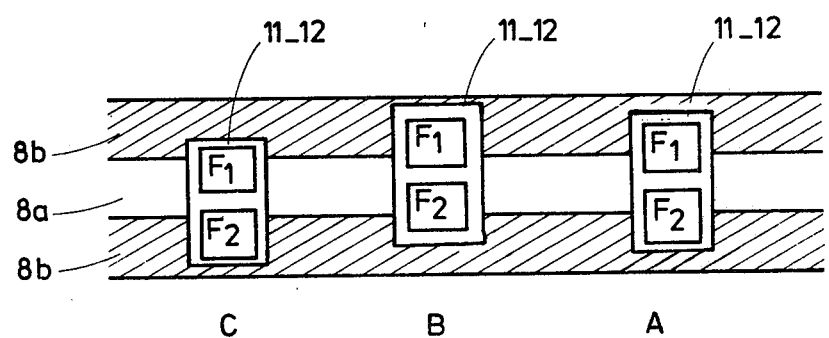
FIG. 7 shows various detection positions for the vehicle optical detector in relation to the optical track along which the vehicle moves.

FIG. 7 shows various possible positions A, B, C of both parts $F_1$, $F_2$ of a detector (11, 12) in relation to a guide-path 8. The structure of each said parts $F_1$, $F_2$ is for example similar to that shown and described in FIG. 4. According to the invention, the guide-path 8 consists of a central strip 8a having a certain optical feature, edged by two lateral strips 8b having optical features quite different from those of said central strip 8a. When normally positioned, (position A in FIG. 7) both parts $F_1$, $F_2$ of each detector overlap the boundary between the central strip 8a and the respective lateral strip 8b. Accordingly, as the signals supplied by the light generators of each of parts $F_1$, $F_2$ of the photo-detector are identical to each other, the received signals are identical too, and thus the comparator 24 (FIG. 4) supplies a null output signal.

On the other hand, when the detector $F_1$, $F_2$ is positioned at B, the beam, and thus the flux received by the part $F_2$, is greater than that received by the part $F_1$, which gives at the output of the comparators a signal with, for example, a negative algebraic sign if the beam $F_1$ is connected to the positive output of said comparator, and the beam $F_2$ at the negative output thereof.

When the position of the detector $F_1$, $F_2$ is at C, the signal supplied by the comparator has an algebraic sign which is opposite to the preceding sign.

When the signal supplied by the comparator is different from 0, said signal alters, in the correct direction and amplitude, the orientation of the steering-wheels 9 thereby to correct the position of the vehicle 1 in relation to the optical guide-line 8 so that the output signal of the comparator 24 becomes null.

The optical detector can also be used for receiving operating signals associated with the path of travel of the vehicle.

Figure 8:
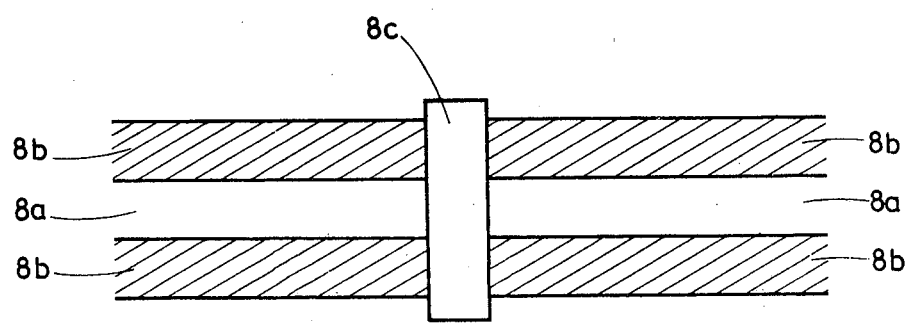
FIGS. 8 to 12 show optical contact studs which can be used on the optical guidance track to control movement of the vehicle.

As shown in FIG. 8, the lateral strips 8b can be crossed by a transverse strip 8c having the same optical characteristics as those of the central strip 8a. When a detector 11, 12 passes over such a transverse strip 8c, also called an "optical stud", the sum of the signals supplied by the parts F1, F2 of the detector exceed the threshold of the normal signal. This signal excess over the threshold is interpreted as being an impulse. By using such optical studs, it is possible to transmit signals corresponding to a determined code.

In the simplest case, the studs are of the same width and serve to transmit an impulse to the circuit of the vehicle so that the latter passes to the next stage of its working program.

Also, it is possible to send different signals obtained either by means of several studs, or by means of studs having a variable width, or again by the combination of these two coding means.

This is for example necessary so that the vehicle might be aware of the various elements of its travel: junctions, bends, elevators, etc.

FIGS. 9, 10, 11, 12 show some examples of use of optical studs.

Figure 9:
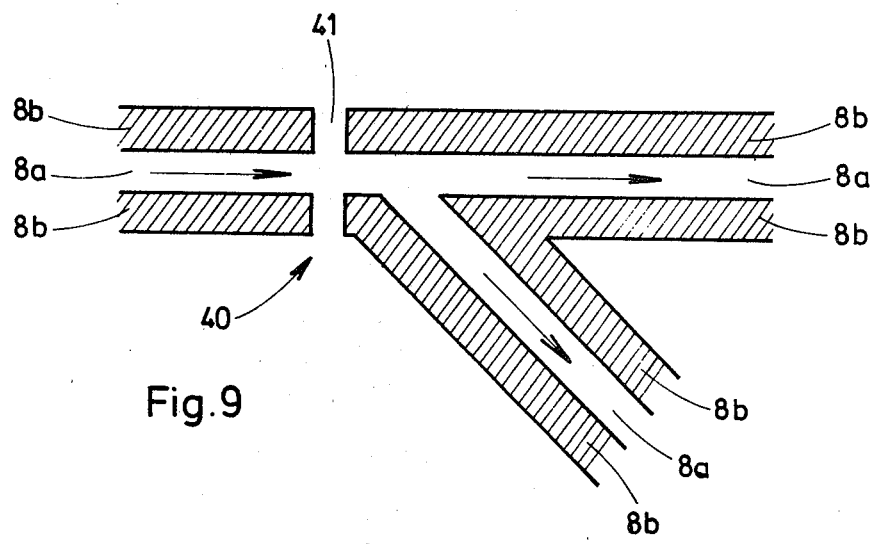

FIG. 9 shows a diverging switch 40 whose inlet carries an optical stud 41. Depending on the coding, said stud can be used for operating the stop, the slowing down or any other maneuvers of the vehicle at the entrance of the switch.

Figure 10:
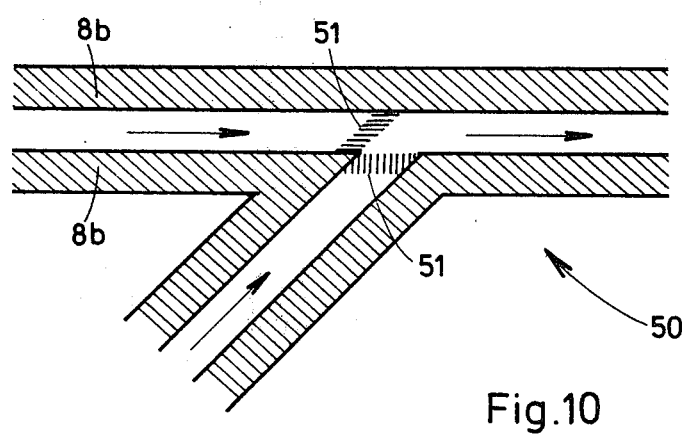

FIG. 10 illustrates a converging switch 50 whose center extends up to the lateral strips 8b by parts 51, having the same optical nature as that of the lateral strips 8b so as to prevent the intersection in each case from not being interpreted as corresponding to an optical stud.

Figure 11:
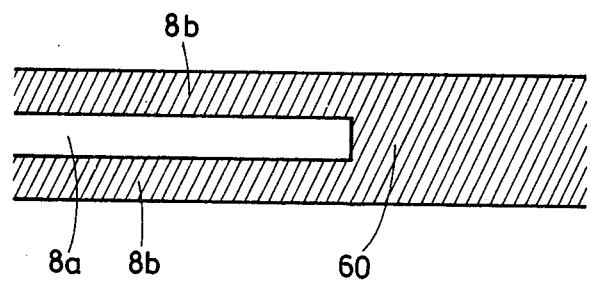
Figure 12:
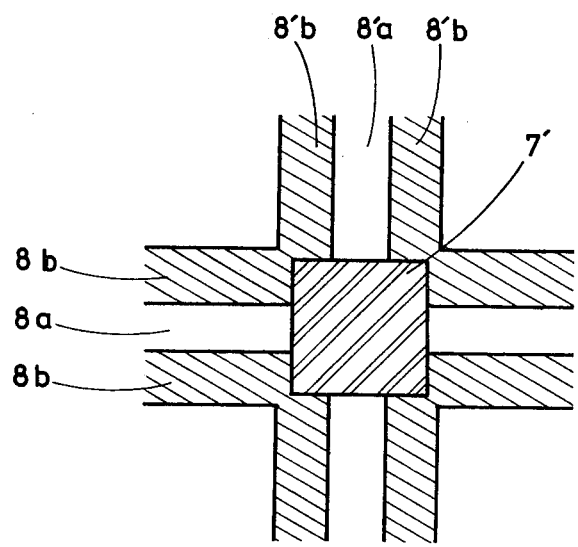

FIG. 11 shows a compulsory stopping point. The central part 8a of the optical guide-track 8 is replaced, from a certain point, by a central strip 60 having the same optical characteristics as the lateral strips 8b. If said lateral strips 8b are not reflecting, the parts $F_1$, $F_2$ of the detector will no longer receive any reflected luminous information. This null signal received by the vehicle will be interpreted as a stopping order. The central part identical on the optical level to the lateral parts must be sufficiently long so that the absence of central part as shown in FIG. 11 is not interpreted as corresponding to the passage on the center of a switch, of a crossing or an optical stud.

So as to prevent such incident of detection from occurring, the center 7' (see FIG. 12) of the crossing consists of a surface having an intermediate color. In such a case, by combining the signals of both detectors for obtaining the sum $F_1+F_2$ and the difference $F_1-F_2$, the same signals as those on a segment of track without a stud are obtained. As a matter of fact, the signals from detectors $F_1$, $F_2$ being equal to one another, their difference will be null. If the intermediate color retransmits 50% of the light, each detector $F_1$, $F_2$ supplies a signal identical to a detecting signal when the detector overlaps a half part of the strip 8b and a half part of the strip 8a.

The installation described herein can be used in manufacturing plants for automatically carrying materials to working stations, or in hospitals for repeated services such as the distribution of meals, linen and the collect thereof, stocking stations, etc. As the guiding and driving of the vehicles can be simply performed by means of optical tracks or with or without a particular program registered on magnetic cards or the like placed in the automatic vehicle, the vehicle can travel along paths consisting of corridors, automatic elevators, etc.

What I claim is:

1. An installation for transporting loads automatically along a predetermined path extending through corridors or the like, which path includes stops, junctions, crossings, inlets, and outlets for vehicles traveling along said path, said installation comprising an optical track laid along the ground to define said path, said optical track consisting of an extended, optically detectable central track section which is bounded along its two opposing edges respectively by a pair of optically detectable lateral track sections, said central and lateral track sections having optical characteristics which are different from one another respectively; and at least one vehicle adapted to be guided along said track, said vehicle comprising a substantially rectangular frame having load support means thereon, said vehicle further comprising four steerable ground-engaging wheels located at the four corners of said frame respectively, said four wheels being interconnected to one another by linkages arranged to cause the positions of said four steerable wheels to change in unison, said vehicle also comprising a motor for driving a single ground-engaging driving wheel which is centrally located along the main axis of said frame, and control means carried by said vehicle for controlling the positioning of said four steerable wheels and the operation of said driving wheel, said control means comprising ultrasonic emitter-receiver means located adjacent an end of said vehicle and oriented forwardly of said vehicle for detecting the presence of obstacles forward of and along the path of movement of said vehicle, and said control means further including at least two light emitter-light receiver assemblies carried by said vehicle and oriented downwardly of said vehicle toward said optical track, said two emitter-receiver assemblies being laterally spaced from one another and being positioned respectively to overlap one of the elongated boundary edges between said central track section and one of said lateral track sections respectively, the emitter in each said assembly being operative to emit light toward its associated elongated boundary edge in said track and the receiver in each said assembly being operative to receive optical signals from the portions of said track which are illuminated by said emitters, the receiver in each of said assemblies being operative to produce an output signal which is a function of the lateral position of said assembly relative to the boundary edge between said central track section and the associated one of said lateral track sections as said vehicle travels along said track, and circuit means responsive to the sum and difference of the two signals provided by the two receivers in said assemblies for simultaneously determining that said difference is substantially null and that said sum is substantially the double of an average value, said circuit means being operative to control the positioning of said four steerable wheels and being operative to control said motor of said vehicle when the difference between said two signals is not null in average.

2. An installation according to claim 1 in which the vehicle is symmetric and reversible.

3. An installation according to claim 2, in which the body of the vehicle is symmetric and has reduced ends, said load support means comprising a loading surface on the top of said vehicle.

4. An installation according to claim 3 including means for elevating the loading surface of the vehicle.

5. An installation according to claim 1, in which the emitter of each assembly carries a luminous source arranged to illuminate a region of predetermined size on said track, and means in said assembly for restricting the field of view of the receiver in said assembly to a limited portion of the region which is illuminated by said luminous source.

6. An installation according to claim 1, in which the optical track carries optical studs consisting of a strip crossing both the central and lateral tracks so as to modify, in a determined manner, the optical signals which are returned by the optical-track.

7. An installation according to claim 1, in which two of said optical tracks cross one another at a junction formed by rejoining all the lateral strips of the optical tracks which cross each other, said installation including a sector at the center of said junction whose optical characteristics correspond to the average of the optical characteristics of the central strip and of the lateral strips.

* * * * *